United States Patent
Khandekar et al.

(10) Patent No.: US 10,291,349 B2
(45) Date of Patent: May 14, 2019

(54) METHOD AND APPARATUS FOR USING MULTIPLE MODULATION SCHEMES FOR A SINGLE PACKET

(71) Applicant: QUALCOMM Incorporated, San Diego, CA (US)

(72) Inventors: Aamod Khandekar, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/172,707

(22) Filed: Jun. 3, 2016

(65) Prior Publication Data

US 2016/0285585 A1 Sep. 29, 2016

Related U.S. Application Data

(62) Division of application No. 11/022,538, filed on Dec. 22, 2004, now Pat. No. 9,385,843.

(51) Int. Cl.
*H04L 1/00* (2006.01)
*H04L 1/18* (2006.01)
*H04L 1/16* (2006.01)

(52) U.S. Cl.
CPC .......... *H04L 1/0003* (2013.01); *H04L 1/0009* (2013.01); *H04L 1/0025* (2013.01);
(Continued)

(58) Field of Classification Search
CPC ... H04L 1/0003; H04L 1/1861; H04L 1/0054; H04L 1/0009; H04L 1/0025;
(Continued)

(56) References Cited

U.S. PATENT DOCUMENTS 5,208,663 A 5/1993 Hiratsuka et al.
5,852,630 A 12/1998 Langberg et al.
(Continued)

FOREIGN PATENT DOCUMENTS

CN 1466297 A 1/2004
EP 1255368 A1 11/2002
(Continued)

OTHER PUBLICATIONS

Assimakopoulos, et al., "Performance Evaluation of a Recursive LA/IR Protocol for MC-CDMA Power Line Communications", Spread Spectrum Techniques and Applications, 2002 IEEE Seventh International Symposium on Sep. 2-5, 2002, Piscataway, NJ, USA, IEEE, vol. 3,p. 677-681.

(Continued)

*Primary Examiner* — Kenneth T Lam
(74) *Attorney, Agent, or Firm* — Dalei Dong; Muncy Geissler Olds & Lowe (57) ABSTRACT

Techniques for using multiple modulation schemes for a single packet are described. Each data packet is processed and transmitted in up to T blocks, where T>1. Multiple modulation schemes are used for the T blocks to achieve good performance. A transmitter encodes a data packet to generate code bits. The transmitter then forms a block of code bits with the code bits generated for the packet, determines the modulation scheme to use for the block (e.g., based on a mode/rate selected for the packet), maps the code bits for the block based on the modulation scheme to obtain data symbols, and processes and transmits the block of data symbols to a receiver. The transmitter generates and transmits another block in similar manner until the data packet is decoded correctly or all T blocks have been transmitted. The receiver performs the complementary processing to receive and decode the packet.

10 Claims, 9 Drawing Sheets

(52) U.S. Cl.
CPC .......... *H04L 1/0054* (2013.01); *H04L 1/1861* (2013.01); *H04L 1/1893* (2013.01); *H04L 1/1671* (2013.01); *H04L 1/1819* (2013.01); *H04L 1/1845* (2013.01); *Y02D 50/10* (2018.01)

(58) Field of Classification Search
CPC ... H04L 1/1893; H04L 1/1671; H04L 1/1819; H04L 1/1845; Y02B 60/31
See application file for complete search history.

(56) References Cited

U.S. PATENT DOCUMENTS

| | | | |
|---|---|---|---|
| 6,529,561 | B2 | 3/2003 | Sipola |
| 6,532,563 | B2 | 3/2003 | Nobelen |
| 6,604,216 | B1 * | 8/2003 | Javerbring ............ H03M 13/27 714/751 |
| 6,721,834 | B2 | 4/2004 | Das et al. |
| 6,778,558 | B2 * | 8/2004 | Balachandran ....... H04L 1/0003 370/216 |
| 6,889,056 | B2 | 5/2005 | Shibutani |
| 6,947,490 | B1 | 9/2005 | Edwards et al. |
| 7,061,892 | B2 | 6/2006 | Takano |
| 7,093,185 | B2 | 8/2006 | Kim et al. |
| 7,139,237 | B2 * | 11/2006 | Nangia .................... H04L 5/023 370/208 |
| 7,289,452 | B2 | 10/2007 | Malkamaki et al. |
| 7,489,621 | B2 | 2/2009 | Maltsev et al. |
| 2002/0119757 | A1 * | 8/2002 | Hamabe ................ H04L 1/0003 455/69 |
| 2002/0159545 | A1 | 10/2002 | Ramesh et al. |
| 2003/0021240 | A1 * | 1/2003 | Moon .................. H04B 7/2631 370/320 |
| 2003/0072305 | A1 | 4/2003 | Odenwalder et al. |
| 2003/0076870 | A1 * | 4/2003 | Moon ................ H04J 13/0048 375/130 |
| 2003/0097629 | A1 * | 5/2003 | Moon .................. H04L 1/0003 714/751 |
| 2003/0103585 | A1 * | 6/2003 | Kim ...................... H04L 1/0003 375/340 |
| 2003/0137950 | A1 * | 7/2003 | Kim .................... H04W 52/265 370/318 |
| 2003/0147474 | A1 | 8/2003 | Ha et al. |
| 2003/0165120 | A1 * | 9/2003 | Uesugi ................. H04L 1/0003 370/282 |
| 2003/0171121 | A1 * | 9/2003 | Kim ...................... H04L 1/0003 455/451 |
| 2004/0038697 | A1 | 2/2004 | Attar et al. |
| 2004/0066843 | A1 | 4/2004 | Moon et al. |
| 2004/0081248 | A1 | 4/2004 | Parolari |
| 2004/0120411 | A1 | 6/2004 | Walton et al. |
| 2004/0132496 | A1 * | 7/2004 | Kim ...................... H04B 7/0669 455/562.1 |
| 2004/0151256 | A1 | 8/2004 | Hwang et al. |
| 2005/0008026 | A1 | 1/2005 | Tanaka et al. |
| 2005/0037719 | A1 | 2/2005 | Takano |
| 2005/0094603 | A1 | 5/2005 | Kim et al. |
| 2005/0108610 | A1 | 5/2005 | Kim et al. |
| 2005/0157687 | A1 * | 7/2005 | Heo ...................... H04L 1/0006 370/335 |
| 2005/0229073 | A1 | 10/2005 | Sudo |
| 2006/0133533 | A1 | 6/2006 | Khandekar et al. |
| 2007/0061690 | A1 | 3/2007 | Stewart et al. |
| 2007/0091866 | A1 | 4/2007 | Nangia et al. |
| 2007/0255993 | A1 | 11/2007 | Yap et al. |
| 2008/0056202 | A1 | 3/2008 | Kim et al. |

FOREIGN PATENT DOCUMENTS

| | | |
|---|---|---|
| JP | 10056420 | 2/1998 |
| JP | 2000188609 | 7/2000 |
| JP | 2000514276 A | 10/2000 |
| JP | 2001119332 | 4/2001 |
| JP | 3240262 B2 | 12/2001 |
| JP | 2001339458 A | 12/2001 |
| JP | 2002124895 | 4/2002 |
| JP | 2002281003 A | 9/2002 |
| JP | 2003134180 A | 5/2003 |
| JP | 2003152691 A | 5/2003 |
| JP | 2003198429 A | 7/2003 |
| JP | 2004104574 | 4/2004 |
| JP | 2004147331 A | 5/2004 |
| JP | 2004153640 A | 5/2004 |
| JP | 2004522377 A | 7/2004 |
| JP | 2004228669 A | 8/2004 |
| JP | 2004260713 A | 9/2004 |
| JP | 2004297182 A | 10/2004 |
| JP | 2004536505 A | 12/2004 |
| JP | 2005507207 T | 3/2005 |
| JP | 2010213294 | 9/2010 |
| WO | WO-9848517 A1 | 10/1998 |
| WO | WO-01078324 | 10/2001 |
| WO | 02065647 A1 | 8/2002 |
| WO | WO-03007567 A1 | 1/2003 |
| WO | WO-03036844 A2 | 5/2003 |
| WO | WO-03045001 A1 | 5/2003 |
| WO | WO-03045002 A1 | 5/2003 |
| WO | WO-03094361 A2 | 11/2003 |
| WO | WO-2004038986 A2 | 5/2004 |
| WO | WO-2004075438 A1 | 9/2004 |

OTHER PUBLICATIONS

Balachandran et al., "Medium Access Control and Radio Resource Management for Packet Data Services Over IS-136 Channels", Vehicular Technology Conference, 1999 IEEE 49th Houston, TX, USA, May 16-20, 1999, Piscataway, NJ, USA, IEEE, US, vol. 1, pp. 133-139.
Cheng J-F et al: "Adaptive incremental 1-7 redundancy [WCDMA systems]" Vehicular Technology Conference, 2003. VTC 2003—Fall. 2003 IEEE 58th Orlando, FL, USA Oct. 6-9, 2003, Piscataway, NJ, USA, IEEE, US, Oct. 6, 2003 (Oct. 6, 2003), pp. 737-741vol.2, XP010700812 ISBN: 0-7803-7954-3 * p. 738, left-hand column, paragraph 1  p. 739, left-hand column, paragraph 2  figure 3 *.
Das A et al: "Adaptive Asynchronous Incremental Redundancy (A2IR) With Fixed Transmission Time Intervals (TTI) for HSDPA" Personal, Indoor and Mobile Radio Communications, 2002. The 13th IEEE International Symposium on Sep. 15-18, 2002, Piscataway, NJ, USA, IEEE, vol. 3, Sep. 15, 2002 (Sep. 15, 2002), pp. 1083-1087, XP010611429 ISBN: 0-7803-7589-0.
Dottling M et al: "Incremental redundancy and bit-mapping techniques for high speed downlink packet access" GLOBECOM'03. 2003—IEEE Global Telecommunications Conference. Conference Proceedings. San Francisco, Dec. 1-5, 2003, IEEE Global Telecommunications Conference, New York, NY: IEEE, US, vol. vol. 7 of 7, Dec. 1, 2003 (Dec. 1, 2003), pp. 908-912, XP010678454.
European Search Opinion—EP09001024—Search Authority—Berlin—dated Apr. 21, 2009.
European Search Report—EP09001024—Search Authority—Berlin—dated Apr. 21, 2009.
European Search Report—EP10150657, Search Authority—Munich Patent Office, dated Feb. 1, 2010.
International Search Report—PCT/US05/046683, International Search Authority—European Patent Office—dated Apr. 27, 2006.
Jung, B.C. et al., "Determining the optimum threshold values for retransmission packets in HARQ schemes", VTC 2003, vol. 3 Apr. 2003, pp. 1935-1939.
Taiwan Search Report—TW094145926—TIPO—dated Jul. 30, 2011.
Taiwan Search Report—TW099107688—TIPO—dated Jan. 24, 2013.
Written Opinion—PCT/US05/046683, International Search Authority, European Patent Office, dated Apr. 27, 2006.

\* cited by examiner

METHOD AND APPARATUS FOR USING MULTIPLE MODULATION SCHEMES FOR A SINGLE PACKET

CLAIMS OF PRIORITY UNDER 35 U.S.C. §§ 119-121

The present Application for Patent is a divisional from U.S. application Ser. No. 11/022,538, which was filed on Dec. 22, 2004. The aforementioned prior application is assigned to the assignee hereof and expressly incorporated herein by reference.

BACKGROUND

Field

The present invention relates generally to communication, and more specifically to data transmission in a communication system.

Background

In a communication system, a transmitter typically encodes, interleaves, and modulates (i.e., symbol maps) traffic data to obtain data symbols, which are modulation symbols for data. For a coherent system, the transmitter multiplexes in pilot symbols with the data symbols. Pilot symbols are modulation symbols for pilot, which is data that is known a priori by both the transmitter and receiver. The transmitter further processes the multiplexed data and pilot symbols to generate a modulated signal and transmits this signal via a communication channel. The channel distorts the transmitted signal with a channel response and also degrades the signal with noise and interference.

The receiver receives the transmitted signal and processes the received signal to obtain received data symbols and received pilot symbols. For a coherent system, the receiver estimates the channel response with the received pilot symbols and performs coherent detection on the received data symbols with the channel response estimates to obtain detected data symbols, which are estimates of the data symbols sent by the transmitter. The receiver then deinterleaves and decodes the detected data symbols to obtain decoded data, which is an estimate of the traffic data sent by the transmitter.

The coding and modulation performed by the transmitter have a large impact on the performance of the data transmission. There is therefore a need in the art for techniques to perform coding and modulation in a manner to achieve good performance.

SUMMARY

Techniques for using multiple modulation schemes (i.e., modulation formats) for a single packet to achieve good performance are described herein. These techniques may be used for various wireless and wireline communication systems. These techniques are also well suited for a system that uses incremental redundancy (IR) transmission, which is described below.

Each data packet may be processed and transmitted in up to T blocks, where T>1. Each block carries code bits for only a portion of the packet and is modulated based on a modulation scheme used for that block. Multiple different modulation schemes are used for the T blocks of the packet to achieve good performance. The modulation schemes for the T blocks may be selected as described below.

A transmitter may encode a data packet in accordance with a base forward error correction (FEC) code (e.g., a Turbo or convolutional code) to generate code bits for the packet. The transmitter then forms a block of code bits with the code bits generated for the packet, e.g., based on a puncturing pattern. The transmitter determines the modulation scheme to use for the block (e.g., based on a mode/rate selected for the data packet) and maps the code bits for the block based on this modulation scheme to obtain data symbols for the block. The transmitter further processes and transmits the block of data symbols to a receiver. The transmitter generates and transmits another block of data symbols in similar manner if the data packet is not decoded correctly by the receiver and if T blocks have not been transmitted for the packet. The receiver performs the complementary processing to receive and decode the packet.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The techniques described herein for using multiple modulation schemes for a single packet may be used for various communication systems such as an Orthogonal Frequency Division Multiple Access (OFDMA) system, a Code Division Multiple Access (CDMA) system, a Time Division Multiple Access (TDMA) system, a Frequency Division Multiple Access (FDMA) system, an orthogonal frequency division multiplexing (OFDM)-based system, a single-input single-output (SISO) system, a multiple-input multiple-output (MIMO) system, and so on. These techniques may be used for systems that utilize incremental redundancy (IR) and systems that do not utilize IR (e.g., systems that simply repeats data). For clarity, these techniques are described for a communication system that uses IR.

Figure 1:
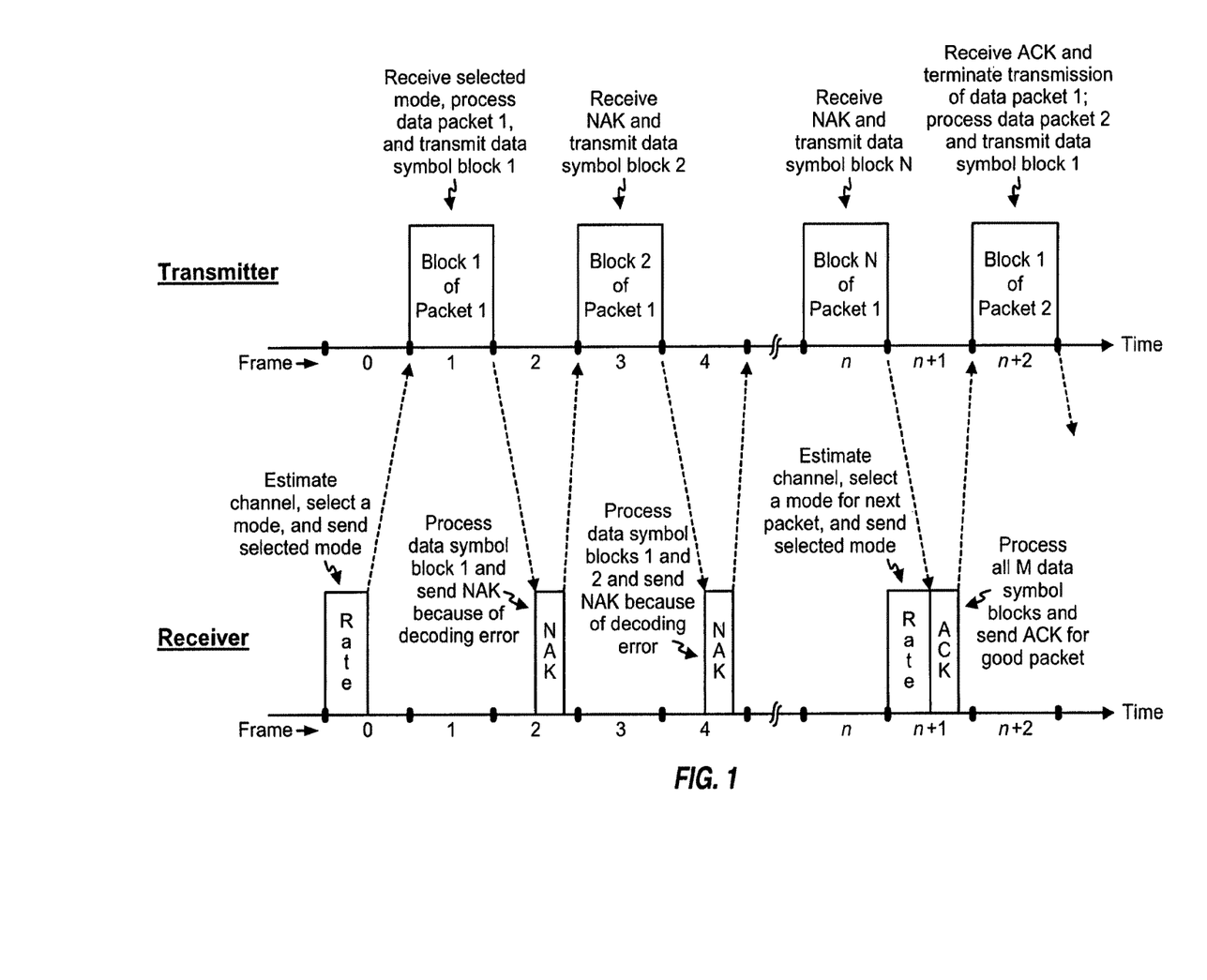
FIG. 1 illustrates an incremental redundancy transmission.

FIG. 1 illustrates an IR transmission between a transmitter and a receiver in a communication system. The timeline for data transmission is partitioned into frames, with each frame having a particular time duration. For the IR transmission embodiment shown in FIG. 1, the receiver initially estimates the communication channel, selects a "mode" based on the channel condition, and sends the selected mode to the transmitter in frame 0. Alternatively, the receiver sends back an estimate of the channel quality, and the transmitter selects the mode based on the channel quality estimate. In any case, the mode may indicate the packet size, the code rate, the modulation scheme, and so on, for the packet. The transmitter processes a data packet (Packet 1) in accordance with the selected mode, and generates up to T blocks of data symbols for the packet. T is the maximum number of blocks for a given data packet and is greater than one (T>1) for IR. The first block typically contains sufficient information to allow the receiver to decode the packet under good channel condition. Each subsequent block typically contains additional parity/redundancy information not contained in prior blocks. The transmitter then transmits the first data symbol block (Block 1) for Packet 1 in frame 1. The receiver receives, detects, and decodes the first data symbol block, determines that Packet 1 is decoded in error (i.e., "erased"), and sends back a negative acknowledgment (NAK) in frame 2. The transmitter receives the NAK and transmits the second data symbol block (Block 2) for Packet 1 in frame 3. The receiver receives and detects Block 2, decodes Blocks 1 and 2, determines that Packet 1 is still decoded in error, and sends back another NAK in frame 4. The block transmission and NAK response may repeat any number of times.

For the example shown in FIG. 1, the transmitter receives a NAK for data symbol block N−1 and transmits data symbol block N (Block N) for Packet 1 in frame n, where N≤T. The receiver receives and detects Block N, decodes Blocks 1 through N, determines that the packet is decoded correctly, and sends back an acknowledgment (ACK) in frame n+1. The receiver also estimates the communication channel, selects a mode for the next data packet, and sends the selected mode to the transmitter in frame n+1. The transmitter receives the ACK for Block N and terminates the transmission of Packet 1. The transmitter also processes the next data packet (Packet 2) in accordance with the selected mode, and transmits the first data symbol block (Block 1) for Packet 2 in frame n+2. The processing at the transmitter and receiver continues in the same manner for each data packet transmitted via the communication channel.

As shown in FIG. 1, with incremental redundancy, the transmitter sends each data packet in a series of block transmissions, with each block transmission carrying a portion of the packet. The receiver may attempt to decode the packet after each block transmission based on all blocks received for the packet. The transmitter terminates the transmission of the packet after successful decoding by the receiver.

For the example shown in FIG. 1, there is a delay of one frame for the ACK/NAK response from the receiver for each block transmission. In general, this delay may be one or multiple frames. To improve channel utilization, multiple data packets may be transmitted in an interlaced manner. For example, data packets for one traffic channel may be transmitted in odd-numbered frames and data packets for another traffic channel may be transmitted in even-numbered frames. More than two traffic channels may also be interlaced, e.g., if the ACK/NAK delay is longer than one frame.

The system may be designed to support a set of modes, which may also be called rates, packet formats, radio configurations, or some other terminology. Each mode may be associated with a particular code rate or coding scheme, a particular modulation scheme, a particular spectral efficiency, and a particular minimum signal-to-noise-and-interference ratio (SINR) required to achieve a target level of performance, e.g., 1% packet error rate (PER). Spectral efficiency refers to the data rate (or the information bit rate) normalized by the system bandwidth, and is given in units of bits per second per Hertz (bps/Hz). In general, higher SINRs are needed for higher spectral efficiencies. The set of supported modes covers a range of spectral efficiencies, typically in increments that are somewhat evenly spaced. For a given channel condition and received SINR, the mode with the highest spectral efficiency supported by that received SINR may be selected and used for data transmission.

Spectral efficiency is determined by the code rate and modulation scheme. The code rate is the ratio of the number of input bits into an encoder to the number of code bits generated by the encoder and transmitted. For example, a code rate of 2/9 (or R=2/9) generates nine code bits for every two input bits. A lower code rate (e.g., R=1/4 or 1/5) has more redundancy and thus greater error correction capability. However, more code bits are transmitted for a lower code rate, and spectral efficiency is thus also lower.

Various modulation schemes may be used for data transmission. Each modulation scheme is associated with a signal constellation that contains M signal points, where M>1. Each signal point is defined by a complex value and is identified by a B-bit binary value, where B≥1 and $2^B$=M. For symbol mapping, the code bits to be transmitted are first grouped into sets of B code bits. Each set of B code bits forms a B-bit binary value that is mapped to a specific signal point, which is then transmitted as a modulation symbol for that group of B code bits. Each modulation symbol thus carries information for B code bits. Some commonly used modulation schemes include Binary Phase Shift Keying (BPSK), Quadrature Phase Shift Keying (QPSK), M-ary Phase Shift Keying (M-PSK), and M-ary Quadrature Amplitude Modulation (M-QAM). The number of code bits per modulation symbol (B) can be given as: B=1 for BPSK, B=2 for QPSK, B=3 for 8-PSK, B=4 for 16-QAM, B=6 for 64-QAM, and so on. B is indicative of the order of a modulation scheme, and more code bits may be sent per modulation symbol for higher order modulation schemes.

The spectral efficiency (S) for a given code rate and a given modulation scheme can be computed as the product of the code rate (R) and the number of code bits per modulation symbol (B) for the modulation scheme, or S=R×B. A given spectral efficiency may be obtained with various different combinations of code rate and modulation scheme (or coding and modulation pairs). For example, a spectral efficiency of S=4/3 may be obtained with the following combinations of code rate and modulation scheme:

QPSK (B=2) and code rate R=2/3;
8-PSK (B=3) and code rate R=4/9;
16-QAM (B=4) and code rate R=1/3; and
64-QAM (B=6) and code rate R=2/9.

The different combinations of code rate and modulation scheme for a given spectral efficiency may have different performance, which may be quantified by the SINR required to achieve the target PER. These different combinations of code rate and modulation scheme may be evaluated (e.g., via computer simulation, empirical measurements, and so on) for different channel conditions and possibly different channel models. The combination of code rate and modulation scheme with the best performance may be selected and included in the set of modes supported by the system.

For a given spectral efficiency, a combination of a higher order modulation scheme and a lower code rate can typically achieve better capacity than a combination with a lower order modulation scheme and a higher code rate. However, a given combination of modulation scheme and code rate that achieves better capacity may not provide better performance because of practical challenges, and there is typically a tradeoff between modulation scheme and code rate. There is an "optimal" combination of modulation scheme and code rate for this tradeoff in order to optimize performance.

The performance advantage of a high order modulation scheme and low code rate combination tends to increase for a frequency or time-selective channel. A frequency selective channel is a communication channel having a frequency response that varies across the system bandwidth (i.e., not flat). A time selective channel is a communication channel having a response that varies over time (i.e., not stationary). A study to determine the best combinations of code rate and modulation scheme for different spectral efficiencies was performed. From the study, a resulting rule of thumb was that code rates of R=1/2 or lower should be used for a frequency/time selective channel. Thus, even if code rates higher than rate 1/2 may be used for a given spectral efficiency, a code rate close to or below rate 1/2 should be used in combination with a higher order modulation scheme. This study was for a specific channel model, and performance may differ for other channel models.

For a system that does not utilize incremental redundancy, each data packet is coded and modulated based on a specific code rate and a specific modulation scheme for a mode selected for that packet. The entire packet is then transmitted and achieves the spectral efficiency associated with the selected mode. The code rate and modulation scheme for each mode supported by the system may be determined by computer simulation, empirical measurements, and so on.

For a system that utilizes incremental redundancy, each data packet is transmitted in one or more blocks until the packet is decoded correctly by the receiver, as described above. Each additional block transmitted for a data packet reduces the spectral efficiency of the packet. The spectral efficiency for each data packet is thus not known a priori and changes with each block transmission for the packet.

Table 1 shows an exemplary set of seven modes supported by the system. Each mode m is associated with a specific modulation scheme and a specific "base" code rate $R_{base,m}$, which is the code rate used for each block transmission. The same base code rate and modulation scheme are used for each block transmission for a given mode. For example, QPSK and a base code rate of R=2/3 are used for mode 3. For a data packet sent with mode 3, each block of the packet is thus transmitted using QPSK and code rate R=2/3. Table 1 assumes that T=4 and a data packet is terminated after four block transmissions regardless of whether or not the packet was decoded correctly.

Each mode is also associated with different "effective" code rates for different numbers of block transmissions. For a data packet sent with mode m, the effective code rate $R_{eff,m}(l)$ for the data packet after the l-th block transmission, where l=1, 2, . . . , T, is equal to the base code rate divided by l, or $R_{eff,m}(l)=R_{base,m}/l$. This is because l times the number of code bits have been sent for the data packet in l block transmissions. For example, a data packet sent with mode 3 has an effective code rate of R=2/3 and a spectral efficiency of S=4/3 if only one block is transmitted for the packet, an effective code rate of R=1/3 and a spectral efficiency of S=2/3 if two blocks are transmitted for the packet, an effective code rate of R=2/9 and a spectral efficiency of S=4/9 if three blocks are transmitted for the packet, and an effective code rate of R=1/6 and a spectral efficiency of S=1/3 if four blocks are transmitted for the packet.

TABLE 1

| | | | Spectral efficiency after . . . | | | |
|---|---|---|---|---|---|---|
| Mode | Modulation Scheme | Base Code Rate | One block transmission | Two block transmissions | Three block transmissions | Four block transmissions |
| 1 | QPSK | R = 1/5 | 2 × (1/5) = 2/5 | 2 × (1/10) = 1/5 | 2 × (1/15) = 2/15 | 2 × (1/20) = 1/10 |
| 2 | QPSK | R = 1/3 | 2 × (1/3) = 2/3 | 2 × (1/6) = 1/3 | 2 × (1/9) = 2/9 | 2 × (1/12) = 1/6 |
| 3 | QPSK | R = 2/3 | 2 × (2/3) = 4/3 | 2 × (2/6) = 2/3 | 2 × (2/9) = 4/9 | 2 × (2/12) = 1/3 |
| 4 | 8-PSK | R = 2/3 | 3 × (2/3) = 2 | 3 × (2/6) = 1 | 3 × (2/9) = 2/3 | 3 × (2/12) = 1/2 |
| 5 | 16-QAM | R = 2/3 | 4 × (2/3) = 8/3 | 4 × (2/6) = 4/3 | 4 × (2/9) = 8/9 | 4 × (2/12) = 2/3 |
| 6 | 64-QAM | R = 5/9 | 6 × (5/9) = 10/3 | 6 × (5/18) = 5/3 | 6 × (5/27) = 10/9 | 6 × (5/36) = 5/6 |
| 7 | 64-QAM | R = 2/3 | 6 × (2/3) = 4 | 6 × (2/6) = 2 | 6 × (2/9) = 4/3 | 6 × (2/12) = 1 |

As shown in Table 1, the effective code rate (which is shown within parentheses in columns 4 through 7) and the spectral efficiency (which is shown after the equal sign in columns 4 through 7) for each mode vary depending on the number of blocks transmitted for a packet. Each mode may thus be used for multiple spectral efficiencies. For each mode, the combination of code rate and modulation scheme that achieves the best performance at a particular spectral efficiency (e.g., with two block transmissions) may be selected and used for that mode. However, this combination of code rate and modulation scheme may not achieve good performance at other spectral efficiencies (e.g., with one, three, and four block transmissions).

To improve performance, different combinations of code rate and modulation scheme may be used for different block transmissions for a given mode. The different combinations of code rate and modulation scheme for each mode may be determined in various manners.

In a first embodiment, the modulation scheme to use for each block transmission is selected based on the spectral efficiency achieved after that block transmission. For each mode m, the modulation scheme $M_m(l)$ for the l-th block transmission may be selected as follows. The spectral efficiency $S_m(l)$ after the l-th block transmission for mode m is first determined from Table 1. The modulation scheme $M_m(l)$ is then set to the lowest order modulation scheme that, in combination with an effective code rate $R'_{eff,m}(l)$ of 1/2 or lower, achieves the spectral efficiency $S_m(l)$. The effective code rate $R'_{eff,m}(l)$ is the code rate for all l block transmissions if the modulation scheme $M_m(l)$ was used for each of the l block transmissions. The relationship between the effective code rate, the modulation scheme, and the spectral efficiency may be expressed as: $S_m(l)=R'_{eff,m}(l)\times B_m(l)$, where $B_m(l)$ is the number of code bits per modulation symbol for modulation scheme $M_m(l)$. The modulation scheme $M_m(l)$ may thus be selected based on the spectral efficiency $S_m(l)$, as follows:

Use QPSK for spectral efficiencies of 1.0 bps/Hz and lower;

Use 8-PSK for spectral efficiencies between 1.0 to 1.5 bps/Hz;

Use 16-QAM for spectral efficiencies between 1.5 to 2.0 bps/Hz; and

Use 64-QAM for spectral efficiencies higher than 2.0 bps/Hz.

The mapping above assumes that only QPSK, 8-PSK, 16-QAM, and 64-QAM are supported by the system. Other mappings may also be used for different sets of supported modulation schemes.

Table 2 shows the modulation scheme selected based on the first embodiment for each block transmission for the seven modes listed in Table 1. The second column of Table 2 shows the base spectral efficiency $S_{base,m}$, which is the spectral efficiency after one block transmission. For each mode m, the modulation scheme to use for each block transmission is determined based on the spectral efficiency after that block transmission and using the spectral efficiency-to-modulation scheme mapping described above. As an example, for mode 3, 8-PSK is used for the first block transmission since the spectral efficiency after this transmission is S=4/3, QPSK is used for the second block transmission since the spectral efficiency after this transmission is S=2/3, and so on. As another example, for mode 6, 64-QAM is used for the first block transmission since the spectral efficiency after this transmission is S=10/3, 16-QAM is used for the second block transmission since the spectral efficiency after this transmission is S=5/3, 8-PSK is used for the third block transmission since the spectral efficiency after this transmission is S=10/9, and QPSK is used for the fourth block transmission since the spectral efficiency after this transmission is S=5/6.

In a second embodiment, for each mode, the particular combination of code rate and modulation scheme to use for each block transmission is independently selected to achieve good performance. For the first block transmission with mode m, various combinations of code rate and modulation scheme with spectral efficiency of $S_{base,m}$ are evaluated (e.g., based on computer simulation, empirical measurements, and so on), and the combination of code rate $R_m(1)$ and modulation scheme $M_m(1)$ with the best performance is selected. For the second block transmission with mode m, various combinations of code rate and modulation scheme with spectral efficiency of $S_{base,m}$ are again evaluated, albeit under the premise that the first block transmission was sent using $M_m(1)$ and $R_m(1)$ and the decoded packet was erased. The combination of code rate $R_m(2)$ and modulation scheme $M_m(2)$ with the best performance for the second block transmission is selected. For the third block transmission with mode m, various combinations of code rate and modulation scheme with spectral efficiency of $S_{base,m}$ are again evaluated, albeit under the premise that the first block transmission was sent using $M_m(1)$ and $R_m(1)$, the second block transmission was sent using $M_m(2)$ and $R_m(2)$, and the decoded packet with both block transmissions was erased. The combination of code rate $R_m(3)$ and modulation scheme $M_m(3)$ with the best performance is again selected. For the fourth block transmission with mode m, various combinations of code rate and modulation scheme with spectral efficiency of $S_{base,m}$ are again evaluated, albeit under the premise that the first block transmission was sent using $M_m(1)$ and $R_m(1)$, the second block transmission was sent using $M_m(2)$ and $R_m(2)$, the third block transmission was sent using $M_m(3)$ and $R_m(3)$, and the decoded packet with all three block transmissions was erased. The combination of code rate $R_m(4)$ and modulation scheme $M_m(4)$ with the best performance is again selected. A different combination of code rate $R_m(l)$ and modulation scheme $M_m(l)$ may thus be selected for each block transmission in mode m.

In a third embodiment, the combination of code rate and modulation scheme that provides the best performance for a designated spectral efficiency for each mode is selected. This designated spectral efficiency is the spectral efficiency after a predetermined number of (e.g., two) block transmissions and assumes that packets are decoded correctly after this many block transmissions. The best modulation scheme for each mode with early termination after the second block transmission is shown by the fourth column in Table 2. For each mode, a higher order modulation scheme is then selected for the first block transmission if the resultant code rate is 1/2 or lower. Table 3 shows the modulation schemes selected for each mode for the third embodiment. This embodiment may reduce complexity at the transmitter and receiver while providing improved performance for the first block transmission, which is the most frequent of all T block transmissions.

TABLE 2

| Mode m | $S_{base,m}$ | First block transmission | Second block transmission | Third block transmission | Fourth block transmission |
|---|---|---|---|---|---|
| 1 | 2/5 | QPSK | QPSK | QPSK | QPSK |
| 2 | 2/3 | QPSK | QPSK | QPSK | QPSK |
| 3 | 4/3 | 8-PSK | QPSK | QPSK | QPSK |
| 4 | 2 | 16-QAM | QPSK | QPSK | QPSK |
| 5 | 8/3 | 64-QAM | 8-PSK | QPSK | QPSK |
| 6 | 10/3 | 64-QAM | 16-QAM | 8-PSK | QPSK |
| 7 | 4 | 64-QAM | 16-QAM | 8-PSK | QPSK |

TABLE 3

| Mode m | $S_{base,m}$ | First block transmission | Second block transmission | Third block transmission | Fourth block transmission |
|---|---|---|---|---|---|
| 1 | 2/5 | QPSK | QPSK | QPSK | QPSK |
| 2 | 2/3 | QPSK | QPSK | QPSK | QPSK |
| 3 | 4/3 | 8-PSK | QPSK | QPSK | QPSK |
| 4 | 2 | 16-QAM | 8-PSK | 8-PSK | 8-PSK |
| 5 | 8/3 | 64-QAM | 16-QAM | 16-QAM | 16-QAM |
| 6 | 10/3 | 64-QAM | 64-QAM | 64-QAM | 64-QAM |
| 7 | 4 | 64-QAM | 64-QAM | 64-QAM | 64-QAM |

Several embodiments for selecting code rate and modulation scheme for each block transmission in each mode have been described above. The code rate and modulation scheme for each block transmission may also be selected in other manners, and this is within the scope of the invention.

Figure 2:
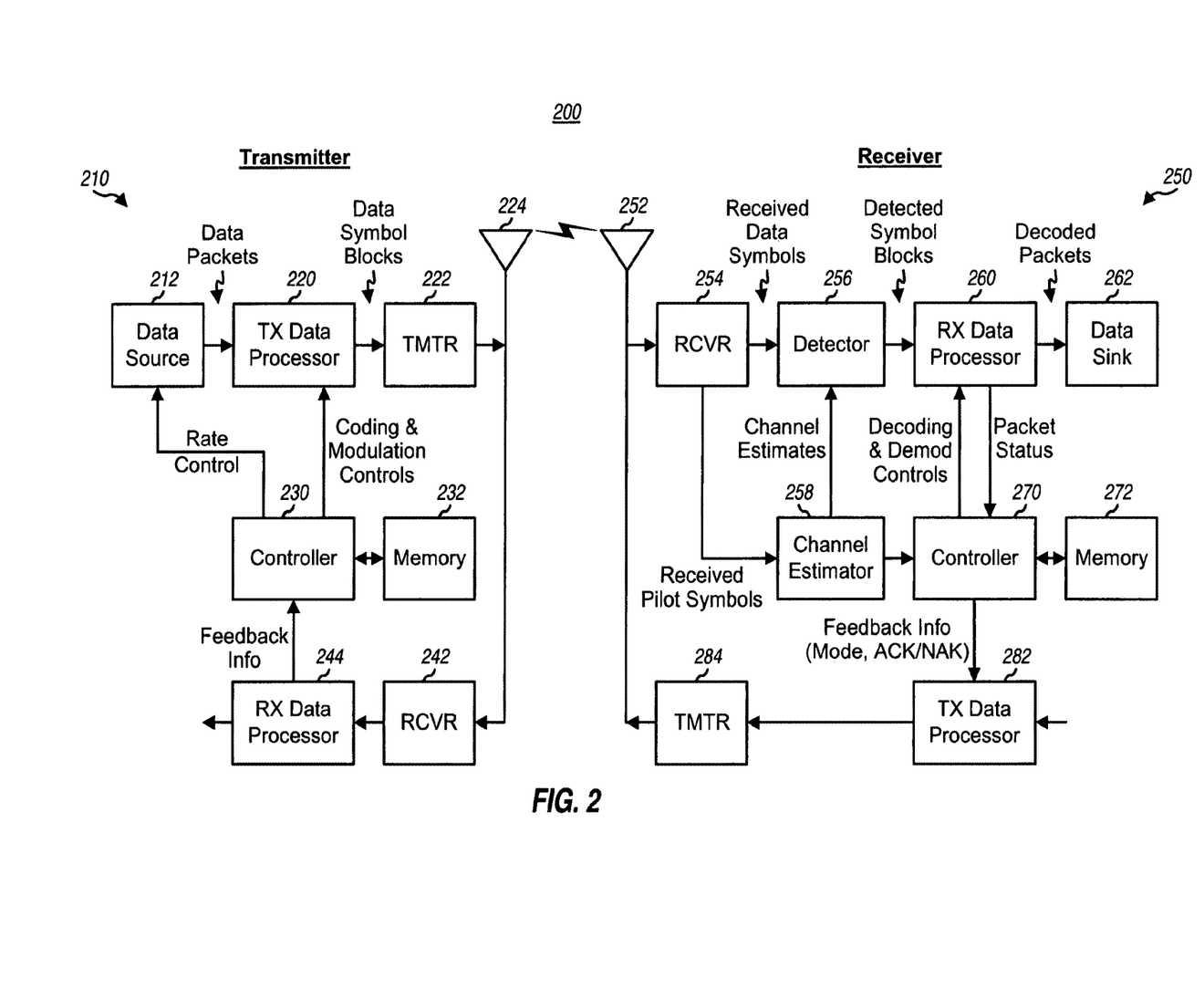
FIG. 2 shows a block diagram of a transmitter and a receiver.

FIG. 2 shows a block diagram of a transmitter 210 and a receiver 250 in a wireless communication system 200 that utilizes IR transmission. At transmitter 210, a TX data processor 220 receives data packets from a data source 212. TX data processor 220 processes (e.g., formats, encodes, partitions, interleaves, and modulates) each data packet in accordance with a mode selected for that packet and generates up to T blocks of data symbols for the packet. The selected mode for each data packet may indicate (1) the packet size (i.e., the number of information bits for the packet) and (2) the particular combination of code rate and modulation scheme to use for each data symbol block of that packet. A controller 230 provides various controls to data source 212 and TX data processor 220 for each data packet based on the selected mode as well as the feedback (ACK/

NAK) received for the packet. TX data processor 220 provides a stream of data symbol blocks (e.g., one block for each frame), where the blocks for each packet may be interlaced with the blocks for one or more other packets.

A transmitter unit (TMTR) 222 receives the stream of data symbol blocks from TX data processor 220 and generates a modulated signal. Transmitter unit 222 multiplexes in pilot symbols with the data symbols (e.g., using time, frequency, and/or code division multiplexing) and obtains a stream of transmit symbols. Each transmit symbol may be a data symbol, a pilot symbol, or a null symbol having a signal value of zero. Transmitter unit 222 may perform OFDM modulation if OFDM is used by the system. Transmitter unit 222 generates a stream of time-domain samples and further conditions (e.g., converts to analog, frequency upconverts, filters, and amplifies) the sample stream to generate the modulated signal. The modulated signal is then transmitted from an antenna 224 and via a communication channel to receiver 250.

At receiver 250, the transmitted signal is received by an antenna 252, and the received signal is provided to a receiver unit (RCVR) 254. Receiver unit 254 conditions, digitizes, and pre-processes (e.g., OFDM demodulates) the received signal to obtain received data symbols and received pilot symbols. Receiver unit 254 provides the received data symbols to a detector 256 and the received pilot symbols to a channel estimator 258. Channel estimator 258 processes the received pilot symbols and provides channel estimates (e.g., channel gain estimates and SINR estimates) for the communication channel. Detector 256 performs detection on the received data symbols with the channel estimates and provides detected data symbols to an RX data processor 260. The detected data symbols may be represented by log-likelihood ratios (LLRs) for the code bits used to form the data symbols (as described below) or by other representations. Whenever a new block of detected data symbols is obtained for a given data packet, RX data processor 260 processes (e.g., deinterleaves and decodes) all detected data symbols obtained for that packet and provides a decoded packet to a data sink 262. RX data processor 260 also checks the decoded packet and provides the packet status, which indicates whether the packet is decoded correctly or in error.

A controller 270 receives the channel estimates from channel estimator 258 and the packet status from RX data processor 260. Controller 270 selects a mode for the next data packet to be transmitted to receiver 250 based on the channel estimates. Controller 270 also assembles feedback information, which may include the selected mode for the next packet, an ACK or a NAK for the packet just decoded, and so on. The feedback information is processed by a TX data processor 282, further conditioned by a transmitter unit 284, and transmitted via antenna 252 to transmitter 210.

At transmitter 210, the transmitted signal from receiver 250 is received by antenna 224, conditioned by a receiver unit 242, and further processed by an RX data processor 244 to recover the feedback information sent by receiver 250. Controller 230 obtains the received feedback information, uses the ACK/NAK to control the IR transmission of the packet being sent to receiver 250, and uses the selected mode to process the next data packet to send to receiver 250.

Controllers 230 and 270 direct the operation at transmitter 210 and receiver 250, respectively. Memory units 232 and 272 provide storage for program codes and data used by controllers 230 and 270, respectively.

Figure 3:
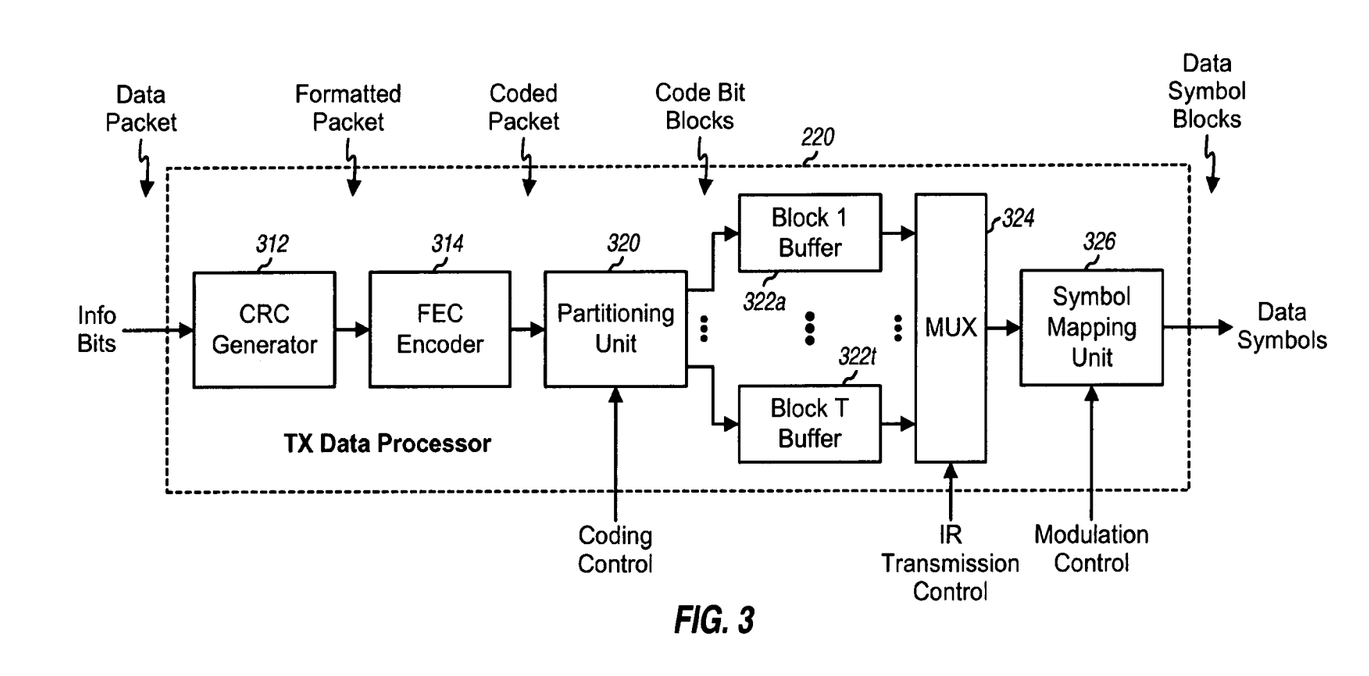
FIG. 3 shows a block diagram of a transmit (TX) data processor.
Figure 4:
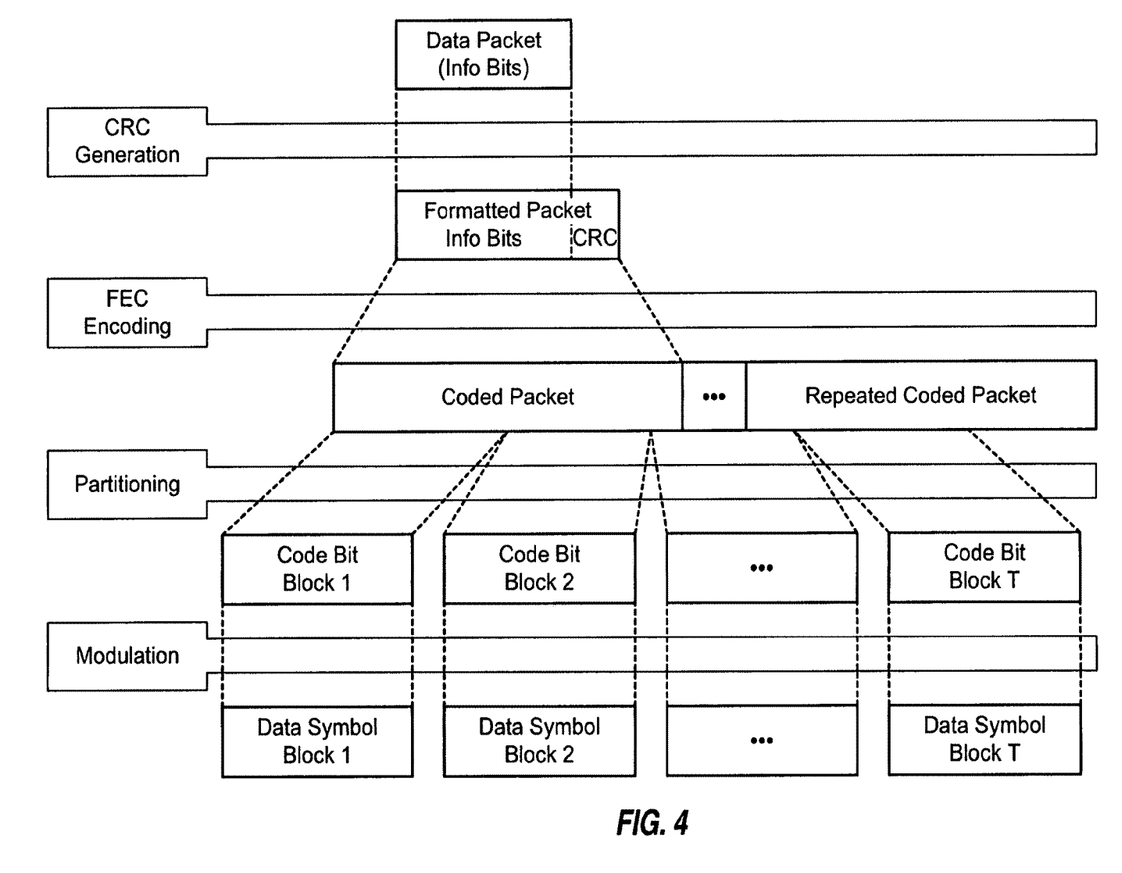
FIG. 4 illustrates processing of one data packet by the TX data processor.

FIG. 3 shows a block diagram of an embodiment of TX data processor 220 at transmitter 210. TX data processor 220 receives data packets, processes each packet based on its selected mode, and provides up to T data symbol blocks for the packet. FIG. 4 illustrates the processing for one data packet by TX data processor 220.

Within TX data processor 220, a cyclic redundancy check (CRC) generator 312 receives a data packet, generates a CRC value for the data packet, and appends the CRC value to the data packet to form a formatted packet. The CRC value is used by the receiver to check whether the packet is decoded correctly or in error. Other error detection codes may also be used instead of CRC. A forward error correction (FEC) encoder 314 encodes the formatted packet in accordance with a base coding scheme and provides a coded packet or "codeword". The encoding increases the reliability of the data transmission. FEC encoder 314 may implement a Turbo code, a convolutional code, a low-density parity check (LDPC) code, or some other code. For example, FEC encoder 314 may implement a rate 1/5 Turbo code and generate 5K code bits for each formatted packet with K input bits, where K is the packet size and may be dependent on the selected mode. An exemplary rate 1/5 Turbo code is defined by IS-2000 standard and described in a document 3GPP2 C.S0024, entitled "cdma2000 High Rate Packet Data Air Interface Specification," which is publicly available.

A partitioning unit 320 receives the code bits for each packet and provides a sufficient number of code bits for each block based on the modulation scheme used for that block, as indicated by a coding control from controller 230. Buffers 322a through 322t receive and store the code bits for blocks 1 through T, respectively, of each packet. Each buffer 322 may also interleave (i.e., reorder) the code bits for its block in accordance with an interleaving scheme. The interleaving provides time and/or frequency diversity for the code bits. A multiplexer (MUX) 324 couples to all T buffers 322a through 322t and provides the T blocks of code bits, one block at a time and if directed by an IR transmission control from controller 230. Multiplexer 324 provides the code bits from buffer 322a for the first block transmission, the code bits from buffer 322b (not shown in FIG. 3) for the second block transmission, and so on, and the code bits from buffer 322t for the last block transmission. Multiplexer 324 provides the next block of code bits if a NAK is received for the data packet. All T buffers 322a through 322t may be purged whenever an ACK is received.

A symbol mapping unit 326 receives the code bits for each block and maps the code bits to modulation symbols. The symbol mapping is performed in accordance with the modulation scheme used for the block, as indicated by a modulation control from controller 230. The symbol mapping may be achieved by (1) grouping sets of B bits to form B-bit binary values, where B=2 for QPSK, B=3 for 8-PSK, B=4 for 16-QAM, and B=6 for 64-QAM, and (2) mapping each B-bit binary value to a point in a signal constellation for the modulation scheme used for the block. Symbol mapping unit 326 provides a block of data symbols for each block of code bits.

For clarity, the partitioning of the code bits of a coded packet into multiple blocks is described below for an exemplary design. For this design, the FEC code is a rate 1/5 Turbo code, the maximum number of block transmissions is four (i.e., T=4), the packet size is K input bits for all modes, and each block contains K/S modulation symbols for a spectral efficiency of S. The use of the same packet size for all modes more clearly illustrates the processing described below for the different modes. In many systems, the number of modulation symbols is fixed for all modes, and the packet size varies for different modes. Thus, different packet sizes may also be used for different modes, and a fixed block size may also be used for all modes.

Figure 5A:
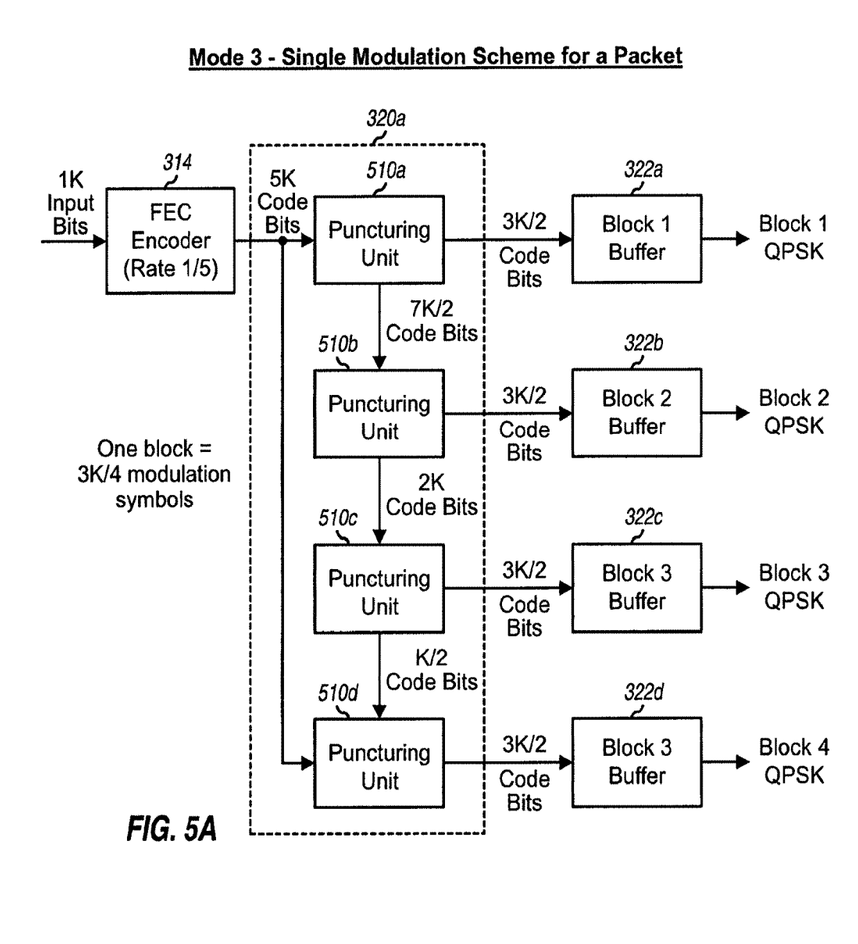
FIG. 5A shows formation of blocks of code bits for a packet with a single modulation scheme.

FIG. 5A shows a block diagram of a partitioning unit 320a for the scheme shown in Table 1 with the same modulation scheme being used for all T block transmissions for a given mode. A data packet is appended with a CRC value to form a formatted packet with K input bits, which is then encoded to generate a coded packet with 5K code bits. For the rate 1/5 Turbo code, the first K code bits are equal to the K input bits and are called systematic bits, and the remaining 4K code bits are generated by the Turbo encoder and are called parity bits.

FIG. 5A shows the partitioning for mode 3 in Table 1, which uses QPSK for each block transmission. For the exemplary design, each block contains 3K/4 modulation symbols for mode 3, and 3K/2 code bits may be sent in one block using QPSK. Within partitioning unit 320a, a puncturing unit 510a receives the 5K code bits for the coded packet, provides 3K/2 code bits for the first block transmission to buffer 322a, and provides the remaining 7K/2 code bits to a puncturing unit 510b. For IR transmission, the K systematic bits and as many parity bits as needed are typically sent in the first block transmission. This allows the receiver to recover the data packet with just one block transmission under favorable channel conditions. The parity bits sent in each block transmission may be taken from across the entire coded packet based on a particular puncturing pattern. Improved decoding performance may be achieved by pseudo-randomly spreading the parity bits for the coded packet across the multiple block transmissions.

Puncturing unit 510b receives the 7K/2 code bits from unit 510a, selects 3K/2 code bits from among the 7K/2 received code bits based on a puncturing pattern used for the second block, provides the 3K/2 selected code bits to buffer 322b, and provides the remaining 2K code bits to a puncturing unit 510c. Unit 510c selects 3K/2 code bits from among the 2K received code bits based on a puncturing pattern used for the third block, provides the 3K/2 selected code bits to a buffer 322c, and provides the remaining K/2 code bits to a puncturing unit 510d. These K/2 code bits are not sufficient for another block. Since the entire coded packet has been transmitted, the same coded packet is repeated as shown in FIG. 4. In general, the coded packet may be repeated as many times as needed for the T block transmissions for the packet. Unit 510d thus also receives code bits from FEC encoder 314, selects the K/2 code bits from unit 510c as well as the 1K systematic bits from FEC encoder 314, and provides the 3K/2 selected code bits to a buffer 322d. The 3K/2 code bits from each of buffers 322a through 322d are thereafter symbol mapped to obtain 3K/4 QPSK modulation symbols.

Figure 5B:
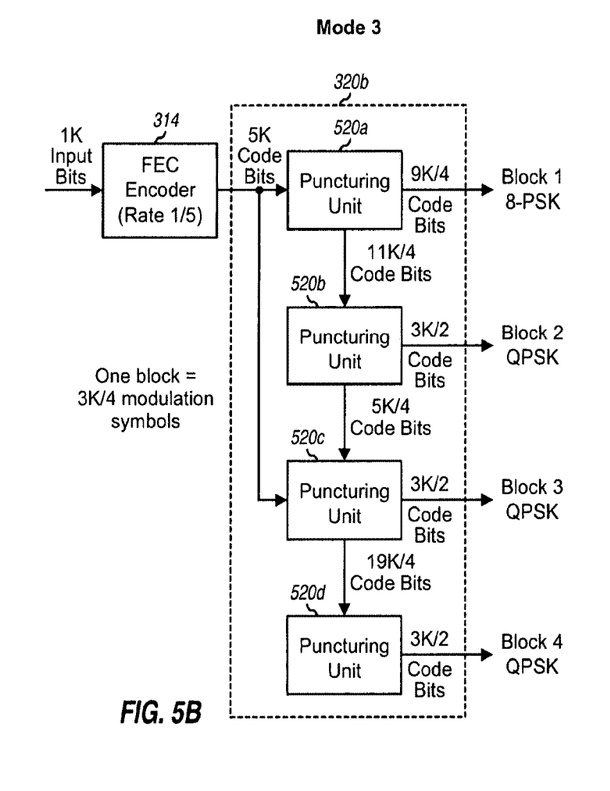
FIGS. 5B and 5C show formation of blocks of code bits for a packet with multiple modulation schemes for two different modes.

FIG. 5B shows a block diagram of a partitioning unit 320b for mode 3 of the embodiment shown in Table 2 with multiple modulation schemes being used for a single packet. For mode 3 in Table 2, 8-PSK is used for the first block and QPSK is used for each subsequent block. Within partitioning unit 320b, a puncturing unit 520a receives the 5K code bits for the coded packet, provides 9K/4 code bits for the first block to buffer 322a, and provides the remaining 11K/4 code bits to a puncturing unit 520b. Unit 520b selects 3K/2 code bits from among the 11K/4 received code bits based on a puncturing pattern used for the second block, provides the 3K/2 selected code bits to buffer 322b, and provides the remaining 5K/4 code bits to a puncturing unit 520c. Unit 520c also receives the 5K code bits from FEC encoder 314, selects the 5K/4 code bits from unit 520b as well as the first K/4 systematic bits from FEC encoder 314, provides the 3K/2 selected code bits to buffer 322c, and provides the remaining 19K/4 code bits to a puncturing unit 520d. Unit 520d selects the remaining 3K/4 systematic bits, selects another 3K/4 parity bits based on a puncturing pattern, and provides the 3K/2 selected code bits to buffer 322d. The code bits from each of buffers 322a through 322d are thereafter symbol mapped to obtain 3K/4 modulation symbols.

Figure 5C:
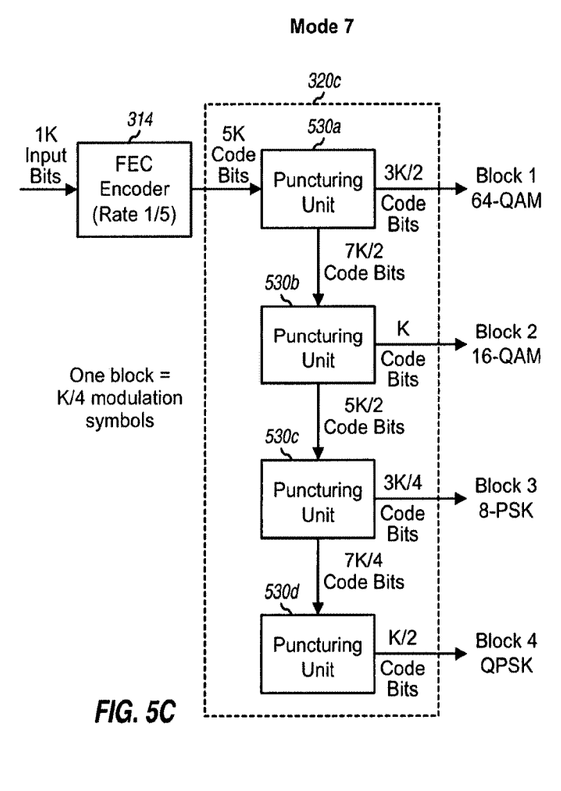

FIG. 5C shows a block diagram of a partitioning unit 320c for mode 7 of the embodiment shown in Table 2, which uses 64-QAM, 16-QAM, 8-PSK, and QPSK for the first, second, third, and fourth block, respectively. For a block size of K/S, each block contains K/4 modulation symbols for mode 7 with S=4, and 3K/2 code bits may be sent in one block using 64-QAM. Within partitioning unit 320c, a puncturing unit 530a receives the 5K code bits for the coded packet, provides 3K/2 code bits for the first block to buffer 322a, and provides the remaining 7K/2 code bits to a puncturing unit 530b. Unit 530b selects K code bits from among the 7K/2 received code bits based on a puncturing pattern used for the second block, provides the K selected code bits to buffer 322b, and provides the remaining 5K/2 code bits to a puncturing unit 530c. Unit 530c selects 3K/4 code bits from among the 5K/2 received code bits based on a puncturing pattern used for the third block, provides the 3K/4 selected code bits to buffer 322c, and provides the remaining 7K/4 code bits to a puncturing unit 530d. Unit 530d selects K/2 code bits from among the 7K/4 received code bits based on a puncturing pattern used for the fourth block, and provides the K/2 selected code bits to buffer 322d. The code bits from each of buffers 322a through 322d are thereafter symbol mapped to obtain K/4 modulation symbols.

FIGS. 5A through 5C show the partitioning and puncturing for an exemplary design and for several modes. The partitioning and puncturing for the T blocks for each mode may be performed as described above or in some other manners. For example, the systematic bits may not be transmitted first for the packet, the code bits for each packet may be selected in a pseudo-random manner, and so on. The FEC (e.g., convolutional) code may also not generate systematic bits, in which case the code bits for each block may be pseudo-randomly selected from across the coded packet. Also, the framing structure may be different from the structure described above.

Figure 6:
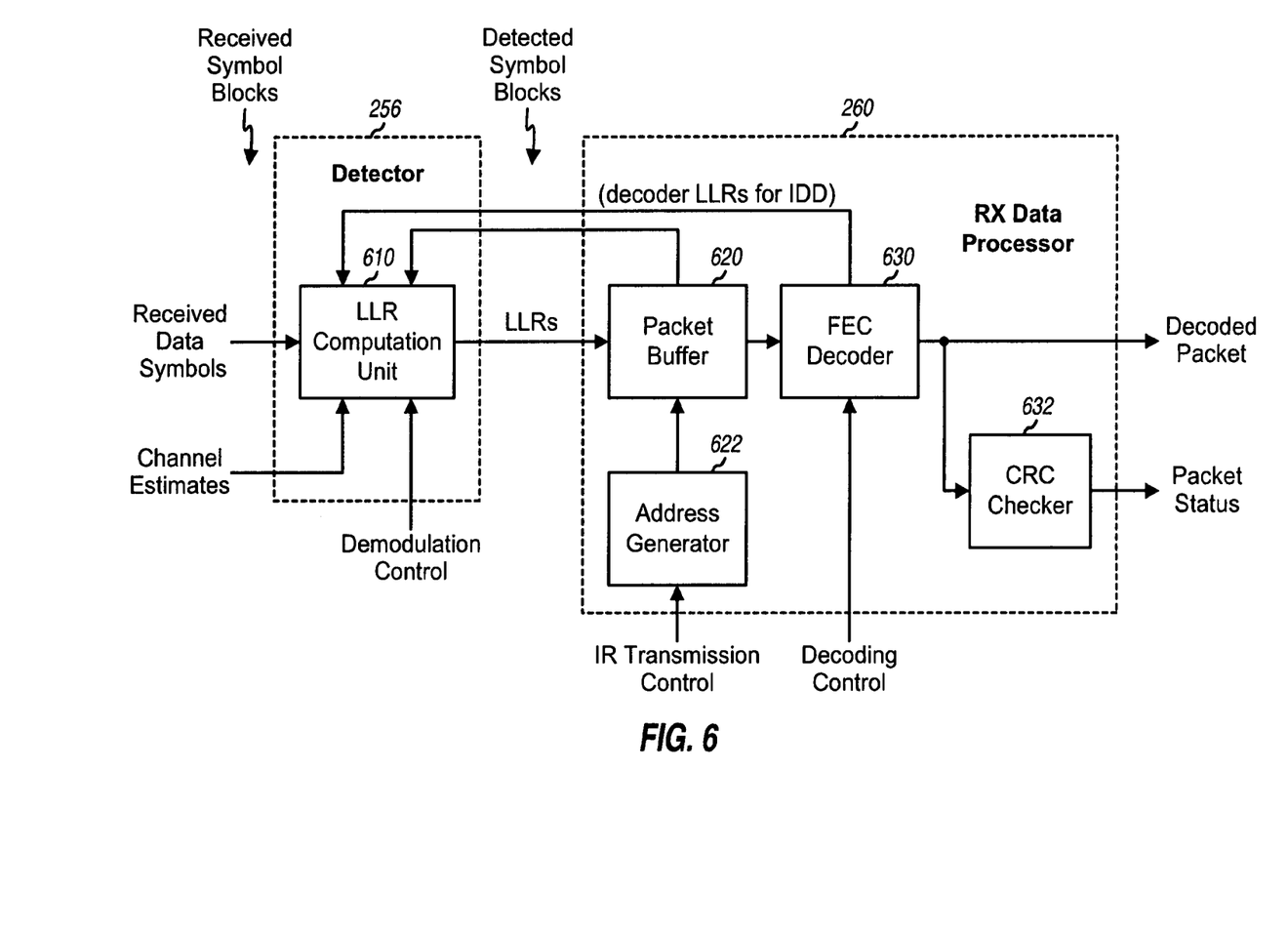
FIG. 6 shows a block diagram of a detector and a receive (RX) data processor.

FIG. 6 shows a block diagram of an embodiment of detector 256 and RX data processor 260 at receiver 250. Within detector 256, an LLR computation unit 610 obtains the received data symbols from receiver unit 254 and the channel estimates from channel estimator 258 and computes the LLRs for the received data symbols. Each received data symbol may be expressed as:

$$\hat{s}_i = h_i \cdot s_i + \eta_i, \qquad \text{Eq (1)}$$

where $s_i$ is the i-th data symbol sent for a data packet;

$h_i$ is a complex channel gain observed by data symbol $s_i$;

$\eta_i$ is the noise and interference observed by data symbol $s_i$; and $\hat{s}_i$ is the i-th received data symbol for the data packet.

Equation (1) assumes a communication channel in which each data symbol $s_i$ observes a single channel gain $h_i$. This may be the case, for example, if each data symbol is sent on one subband using OFDM, or if the communication channel has a single channel tap for a single propagation path. The noise may be assumed to be additive white complex Gaussian noise (AWGN) with zero mean and a variance of $v_i$.

Each received data symbol $\hat{s}_i$ is an estimate of a transmitted data symbol $s_i$, which is obtained by mapping B code bits $\underline{b}_i=[b_{i,1}\ b_{i,2}\ \ldots\ b_{i,B}]$ to a point in a signal constellation for the modulation scheme used for that data symbol $s_i$. The LLR of the j-th code bit for received data symbol $\hat{s}_i$ may be expressed as:

$$LLR_{i,j} = \log\left[\frac{Pr(\hat{s}_i \mid b_{i,j}=1)}{Pr(\hat{s}_i \mid b_{i,j}=-1)}\right], \quad \text{Eq (2)}$$

for $$j = 1, \ldots, B,$$

where $b_{i,j}$ is the j-th code bit for received data symbol $\hat{s}_i$;

$Pr(\hat{s}_i|b_{i,j}=1)$ is the probability of received data symbol $\hat{s}_i$ with bit $b_{i,j}$ being 1;

$Pr(\hat{s}_i|b_{i,j}=-1)$ is the probability of received data symbol $\hat{s}_i$ with bit $b_{i,j}$ being -1 (i.e., '0'); and $LLR_{i,j}$ is the LLR of code bit $b_{i,j}$.

An LLR is a bi-polar value, with a larger positive value corresponding to higher likelihood of the code bit being a +1 and a larger negative value corresponding to higher likelihood of the code bit being a -1. An LLR of zero indicates that the code bit is equally likely to be +1 or -1.

If the B code bits for each received data symbol $\hat{s}_i$ are independent, which may be achieved with appropriate interleaving, then equation (2) may be expressed as:

$$LLR_{i,j} = \log\left[\frac{\sum_{s\in\Omega_{j,1}} \exp\left[\frac{-1}{v_i}|\hat{s}_i - \hat{h}_i \cdot s|^2\right]}{\sum_{s\in\Omega_{j,-1}} \exp\left[\frac{-1}{v_i}|\hat{s}_i - \hat{h}_i \cdot s|^2\right]}\right], \quad \text{Eq (3)}$$

where $\Omega_{j,q}$ is a set of points in the signal constellation whose j-th code bit is equal to q;

s is a modulation symbol or signal point in the set $\Omega_{j,q}$ being evaluated; and $\hat{h}_i$ is an estimate of the channel gain for received data symbol $\hat{s}_i$.

The signal set $\Omega_{j,1}$ for q=1, the signal set $\Omega_{j,-1}$ for q=-1, and the parameter B are all dependent on the modulation scheme used for the received data symbol $\hat{s}_i$. Different modulation schemes may be used for different blocks of a packet, and $\Omega_{j,1}$, $\Omega_{j,-1}$, and B may be different for different blocks.

Equation (3) may be evaluated in various manners, as is known in the art. Unit 610 computes B LLRs, denoted as $\{LLR_{i,j}\}$, for the B code bits of each received data symbol $\hat{s}_i$. Unit 610 may also combine LLRs computed for multiple transmissions of the same data symbol $s_i$, so that only one LLR is stored for each code bit of a coded packet, which can reduce memory requirement. Unit 610 may also quantize the LLR for each code bit to a predetermined number of bits to facilitate storage. The number of bits to use for the LLRs is dependent on various factors such as the requirements of the decoder, the SINR of the received data symbols, and so on. Unit 610 provides LLRs for the code bits of each received data block to RX data processor 260.

Within RX data processor 260, a packet buffer 620 stores the LLRs for the code bits of each data packet. Prior to receiving a new data packet, buffer 620 is initialized or filled with erasures, which are LLR values of zero. An erasure is a value that substitutes for a missing code bit (one that is not yet received or not transmitted at all) and is given appropriate weight in the decoding process. An address generator 622 generates an appropriate address for each LLR received from unit 610, so that the LLR is stored at the proper location for the packet. The address for the LLR for each code bit may be generated based on (1) the mode selected for the data packet, (2) the particular block in which the code bit is received, and (3) the puncturing pattern used for this block, all of which may be indicated by an IR transmission control.

Whenever a new data symbol block is received from transmitter 210 for a data packet, the decoding may be performed anew on the LLRs for all blocks received for that packet. Packet buffer 620 provides a sequence of LLRs and erasures (i.e., a reassembled packet) to an FEC decoder 630 for decoding. This sequence contains LLRs for all data symbols received for the packet and erasures for all data symbols not received for the packet. After receiving the first block, the sequence contains LLRs for the code bits carried in block 1 and erasures for all other code bits. After receiving the second block, the sequence contains LLRs for the code bits carried in blocks 1 and 2 and erasures for all other code bits. FEC decoder 630 decodes the sequence of LLRs and erasures in a manner complementary to the FEC encoding performed at transmitter 210, as indicated by a decoding control from controller 270. For example, a Turbo decoder or a Viterbi decoder may be used for FEC decoder 630 if Turbo or convolutional coding, respectively, is performed at transmitter 210. FEC decoder 630 provides a decoded packet. A CRC checker 632 then checks the decoded packet to determine whether the packet is decoded correctly or in error and provides the status of the decoded packet.

Receiver 250 may also decode a packet using an iterative detection and decoding (IDD) scheme. The IDD scheme exploits the error correction capabilities of the FEC code to provide improved performance. This is achieved by iteratively passing a priori information between LLR computation unit 610 and FEC decoder 630 for multiple iterations. The a priori information indicates the likelihood of the transmitted code bits for the received data symbols. For each iteration, LLR computation unit 610 computes the LLRs for the code bits based on the received data symbols, the channel estimates, and decoder LLRs from FEC decoder 630. Equation (2) may be revised to take into account the decoder LLRs. FEC decoder 630 then decodes the updated LLRs from unit 610 to obtain new decoder LLRs, which may be provided back to unit 610. During the iterative detection and decoding process, the reliability of the detected data symbols improves with each detection/decoding iteration.

In general, receiver 250 may perform data detection and decoding in various manners. The generation of LLRs is a specific decoding implementation that is typically used for Turbo and convolutional codes. Receiver 250 may use any general decoding technique applicable to the encoding technique used at transmitter 210.

Figure 7:
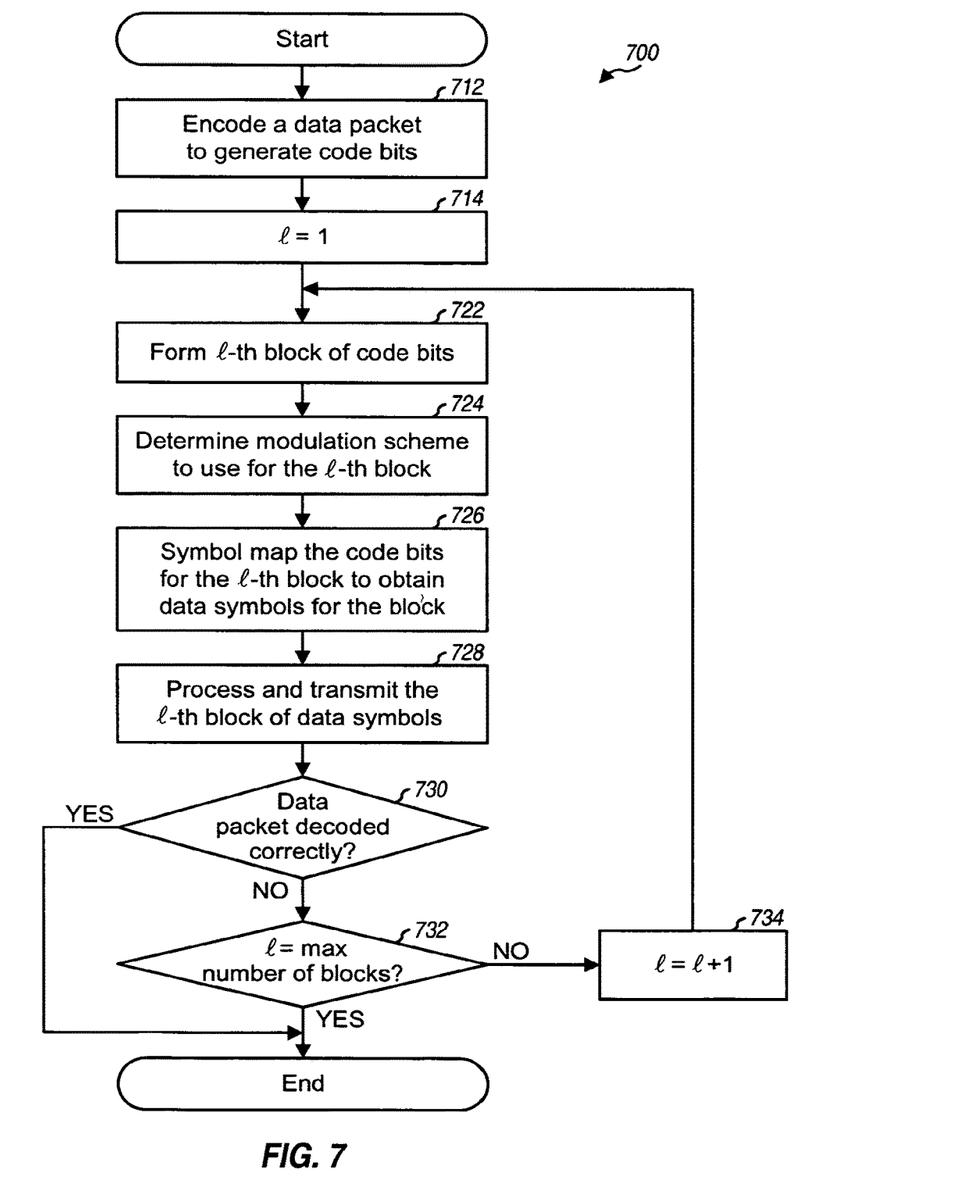
FIGS. 7 and 8 show processes to respectively transmit and receive a data packet with multiple modulation schemes.

FIG. 7 shows a flow diagram of a process 700 performed by transmitter 210 to transmit a data packet. The transmitter first encodes the data packet (e.g., with a base FEC code) to generate code bits (block 712). An index l for block number is initialized to 1 for the first block (block 714). To transmit the l-th block, a block of code bits is formed with the code bits generated for the data packet and taking into account code bits already sent for the packet (block 722). The modulation scheme to use for the l-th block is determined based on the mode selected for the data packet (block 724). The code bits for the l-th block are then mapped to data symbols based on the modulation scheme for this block (block 726). The l-th block of data symbols are further processed and transmitted (block 728). If the data packet is not decoded correctly based on l block transmissions (as determined in block 730) and if the maximum number of blocks have not been transmitted (as determined in block 732), then the index l is incremented (block 734), and the process returns to block 722 to generate and transmit the next block of data symbols. Otherwise, the process terminates.

Figure 8:
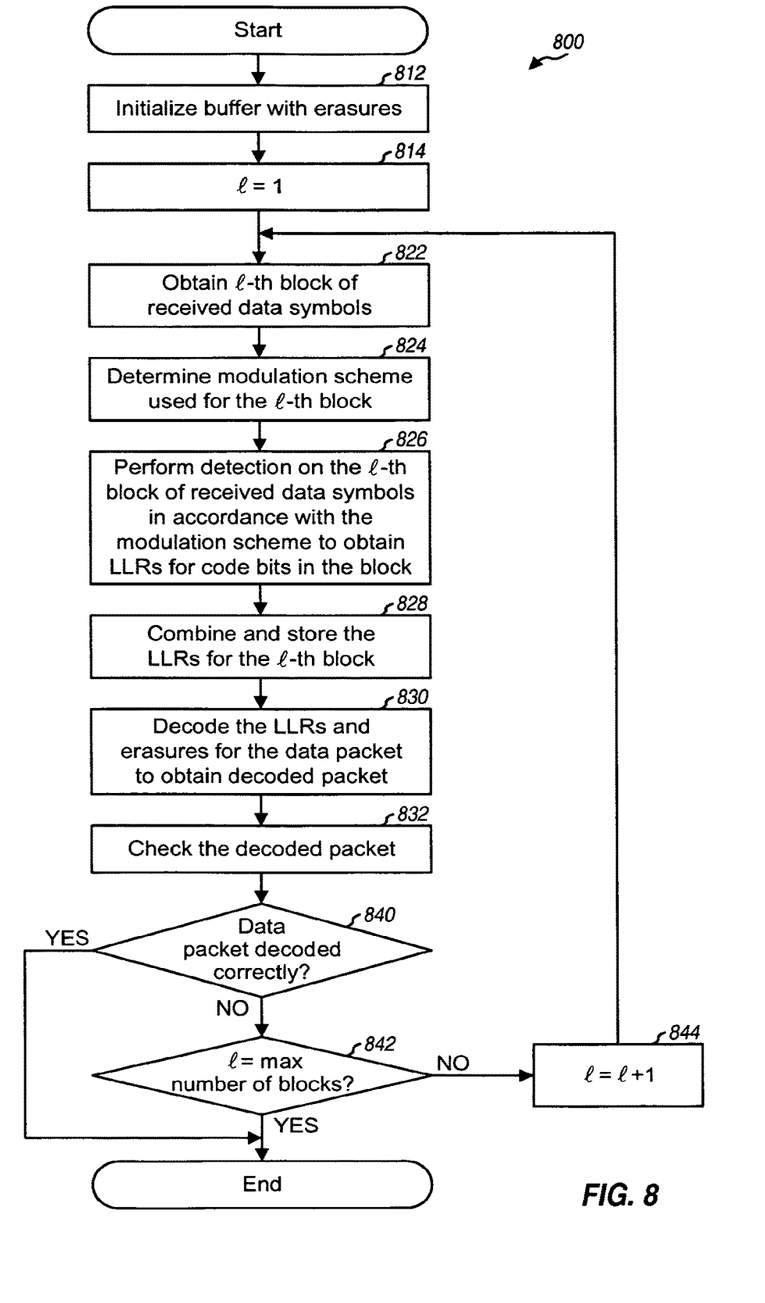

FIG. 8 shows a flow diagram of a process 800 performed by receiver 250 to receive a data packet. The receiver first initializes the packet buffer with erasures for all code bits of the data packet (block 812). The index l for block number is initialized to 1 for the first block (block 814). For the l-th block, a block of received data symbols is initially obtained (block 822). The modulation scheme used for the l-th block is determined based on the mode selected for the data packet (block 824). The receiver then performs detection on the l-th block of received data symbols in accordance with the modulation scheme used for the block to obtain LLRs for the code bits sent in the block (block 826). The LLRs for the l-th block may be combined with LLRs previously computed for code bits in this block (block 828). In any case, the LLRs for the l-th block are stored in the proper locations in the packet buffer (also block 828). The LLRs and erasures for the data packet are then retrieved from the packet buffer and decoded in accordance with the base FEC code to obtain a decoded packet (block 830), which is further checked to determine whether the packet was decoded correctly or in error (block 832). If the data packet was not decoded correctly based on l blocks of received data symbols (as determined in block 840) and if the maximum number of blocks have not been obtained (as determined in block 842), then the index l is incremented (block 844), and the process returns to block 822 to obtain and process the next block of received data symbols. Otherwise, the process terminates.

The use of multiple modulation schemes for a single data packet can provide improved performance. Using a higher order modulation scheme (in combination with a correspondingly lower code rate) for the first block transmission may provide significant gains (e.g., 1 to 2.5 dB) for this block transmission for certain channel models. Using lower order modulation schemes (and correspondingly higher code rates) for later block transmissions avoids or reduces repetition of the coded packet, which may also improve performance. For example, a coded packet is partially repeated if 64-QAM is used for all four block transmissions in mode 7 and is not repeated if 64-QAM, 16-QAM, 8-PSK, and QPSK are used for the four block transmissions.

The techniques described herein for using multiple modulation schemes for a single packet may be implemented by various means. For example, these techniques may be implemented in hardware, software, or a combination thereof. For a hardware implementation, the processing units at a transmitter (e.g., TX data processor 220) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a receiver (e.g., detector 256 and RX data processor 260) may also be implemented within one or more ASICs, DSPs, and so on.

For a software implementation, the techniques may be implemented with modules (e.g., procedures, functions, and so on) that perform the functions described herein. The software codes may be stored in a memory unit (e.g., memory units 232 and 272 in FIG. 2) and executed by a processor (e.g., controllers 230 and 270). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of receiving data in a communication system, comprising:
   obtaining a plurality of blocks of received data symbols for a data packet, the plurality of blocks being received in succession with each successive block including the data packet with a higher amount of coding redundancy relative to a preceding block;
   determining a mode for the data packet that is based on a single channel condition and indicates a modulation scheme to be used for each of the plurality of blocks prior to transmission of any of the plurality of blocks, wherein the mode indicates at least two different modulation schemes to be used for two or more different blocks from the plurality of blocks based on the single channel condition;
   performing detection on each of the plurality of blocks of received data symbols in accordance with the modulation scheme used for the block to generate detected data symbols for the block; and
   decoding detected data symbols generated from the plurality of blocks of received data symbols to obtain a decoded packet.

2. The method of claim 1, wherein the performing detection on each of the plurality of blocks of received data symbols comprises
   generating a set of log-likelihood ratios (LLRs) for a set of code bits for each received data symbol.

3. The method of claim 1, wherein the performing detection on each of the plurality of blocks of received data symbols comprises
   performing detection on a first block of received data symbols, obtained first, in accordance with a first modulation scheme having a highest order among the at least two different modulation schemes.

4. The method of claim 3, wherein the performing detection on each of the plurality of blocks of received data symbols further comprises
   performing detection on a second block of received data symbols, obtained second, in accordance with a second modulation scheme having a second highest order among the at least two different modulation schemes.

5. The method of claim 1, wherein the decoding the detected data symbols comprises
   after obtaining each of the plurality of blocks of received data symbols, decoding detected data symbols generated for all blocks of received data symbols to obtain the decoded packet.

6. An apparatus in a communication system, comprising:
   a receiver unit operative to obtain a plurality of blocks of received data symbols for a data packet, the plurality of blocks being received in succession with each successive block including the data packet with a higher amount of coding redundancy relative to a preceding block;

a controller operative to determine a mode for the data packet that is based on a single channel condition and indicates a modulation scheme to be used for each of the plurality of blocks prior to transmission of any of the plurality of blocks, wherein the mode indicates at least two different modulation schemes to be used for two or more different blocks from the plurality of blocks based on the single channel condition;

a detector operative to perform detection on each of the plurality of blocks of received data symbols in accordance with the modulation scheme used for the block to generate detected data symbols for the block; and a decoder operative to decode detected data symbols generated from the plurality of blocks of received data symbols to obtain a decoded packet.

7. The apparatus of claim 6, wherein the detector is operative to perform detection on a block of received data symbols, obtained first, in accordance with a first modulation scheme having a highest order among the at least two different modulation schemes.

8. An apparatus in a communication system, comprising:

means for obtaining a plurality of blocks of received data symbols for a data packet, the plurality of blocks being received in succession with each successive block including the data packet with a higher amount of coding redundancy relative to a preceding block;

means for determining a mode for the data packet that is based on a single channel condition and indicates a modulation scheme to be used for each of the plurality of blocks prior to transmission of any of the plurality of blocks, wherein the mode indicates at least two different modulation schemes to be used for two or more different blocks from the plurality of blocks based on the single channel condition;

means for performing detection on each of the plurality of blocks of received data symbols in accordance with the modulation scheme used for the block to generate detected data symbols for the block; and means for decoding detected data symbols generated from the plurality of blocks of received data symbols to obtain a decoded packet.

9. A method of receiving data in a communication system, comprising:

obtaining a block of received data symbols for a data packet;

determining a modulation scheme used for the block of received data symbols;

performing detection on the block of received data symbols in accordance with the modulation scheme to generate detected data symbols for the block, wherein each detected data symbol is an estimate of a modulation symbol for the data packet;

decoding detected data symbols generated from all blocks of received data symbols obtained for the data packet to derive a decoded packet; and repeating the obtaining the block of received data symbols, the determining the modulation scheme used for the block, the performing detection on the block of received data symbols, and the decoding the detected data symbols for another block of received data symbols if the data packet is decoded in error and if a maximum number of blocks of received data symbols have not been obtained for the data packet, wherein the another block of received data symbols includes the data packet in association with a higher amount of coding redundancy relative to the block of received data symbols, and wherein at least two different modulation schemes that are specified by a mode for the data packet are used for the maximum number of blocks of received data symbols, the mode being selected based on a single channel condition prior to any blocks being received for the data packet.

10. The method of claim 9, further comprising:

combining multiple detected data symbols generated for each modulation symbol.

\* \* \* \* \*